United States Patent Office 3,269,869
Patented August 30, 1966

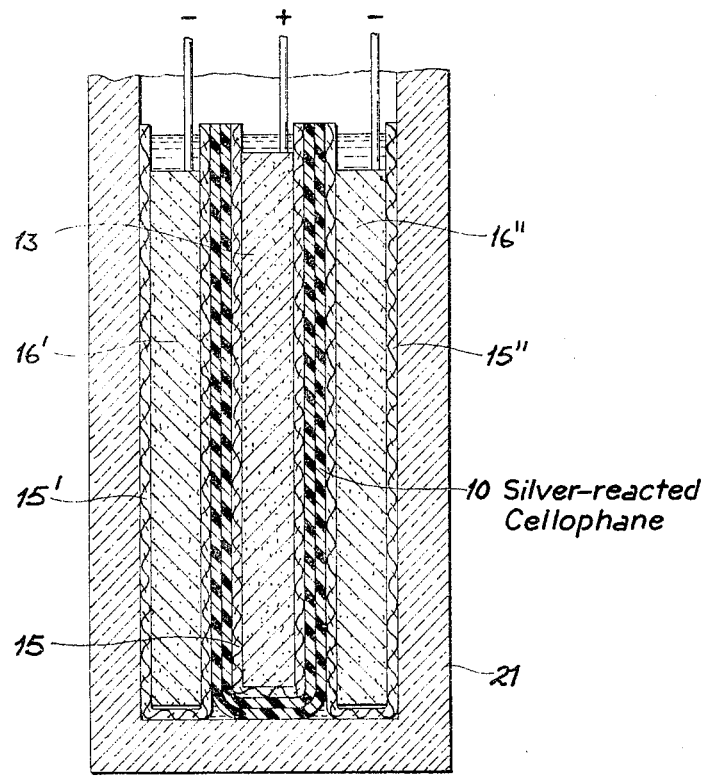

3,269,869
INTER-ELECTRODE SEPARATOR
Meyer Mendelsohn, New York, N.Y., assignor, by mesne assignments, to Yardney International Corp., New York, N.Y., a corporation of New York
Original application Jan. 7, 1958, Ser. No. 707,618. Divided and this application June 21, 1963, Ser. No. 301,223
4 Claims. (Cl. 136—146)

This application is a division of application Ser. No. 707,618, filed January 7, 1958 (now abandoned) as a continuation-in-part of my then copending application Ser. No. 593,122, filed June 22, 1956 (now Patent No. 3,013,099) as a continuation of applications Ser. No. 285,785, filed May 2, 1952 (now abandoned) and Ser. No. 304,854, filed August 16, 1952 (now U.S. Patent 2,785,106 issued March 12, 1957). In addition, this application contains features disclosed in my now abandoned application Ser. No. 458,275, filed September 24, 1954 and application Ser. No. 345,741, filed March 30, 1953 (now Patent No. 3,004,010), as well as Ser. No. 392,517, filed November 16, 1953 (now U.S. Patent No. 2,854,441).

The present invention relates to inter-electrode separators for electrochemical cells and more particularly to separators used in rechargeable batteries.

In the above applications I have disclosed processes for the preparation of silver compounds of polymeric materials. In particular, I have shown therein that silver compounds of cellulose and certain thermoplastics, such as polyvinyl alchol, are useful as separators for batteries of the André-Yardney type where silver and zinc are the electrodes and the separator system includes layers of semi-permeable sheet material held under pressure between the electrodes.

It is an object of this invention to provide separators for all classes of cells which will extend the lives of the cells as well as improve their performance characteristics.

It is another object of this invention to provide inter-electrode separators for "dry" and "wet" cells which will improve their performance with regard to storage, rate and/or rechargeability.

It has been found that the above objects can be achieved through the use of electrolyte-permeable separators containing metallic compounds of polymers. The particular metal depends on the electrode system of the cell and the particuar polymer depends on the electrolyte used in the cell.

The operation of all the present-day electrochemical cells utilizing active-metal electrodes is based on the oxidation and reduction of the active materials and the utilization of the chemical energy freed by the reactions. The vigor of these reactions which take place not only at the electrode surfaces but also throughout the electrolyte has a tendency to involve the separator materials. Such involvement includes embrittlement, depolymerization and often chemical alteration of the separator materials. This, in the course of time, reduces the functional capacity of the materials from chemical and physical standpoints. The separator according to this invention, however, is substantially free from this type of degradation. The organo-metallic compounds in the polymeric structure of the separator materials imparts an apparent consolidation of structure resulting in increased oxidation-reduction resistance and enhanced physical strength.

Since the separator must permit the free passage of ions through their bodies either through pores in the body of the materials or via electrolyte absorbed within the polymer structure, it is desirable to choose materials free from hydrophobic groupings and preferably possessing hydrophilic groupings. Among materials having hydrophilic groupings there may be included cellulose, cellophane, polyvinyl alcohol, methyl cellulose, and the alkali carboxymethyl celluloses as well as similar polymers. Among the polymers which have not true hydrophilic properties but are characterized by either neutralization or absence of hydrophobic groups, there may be mentioned the cellulose esters including the acetates, butyrals, nitrates, as well as the partially hydrolyzed polyvinyl esters, and the class of modified polymers which are normally hydrophobic but which have been chemically altered to neutralize the hydrophobic characteristics by the introduction of hydrophilic groupings without altering the structure as disclosed in now abandoned application Ser. No. 542,596, filed Oct. 25, 1955 by C. Horowitz and myself, describing the treatment of nylon to render it wettable by splitting off its hydrophobic side chains through prolonged immersion in heated alkaline solutions.

The choice of the metal introduced into the polymers depends to a considerable degree on the type of cell for which the separator is utilized. For certain types of high-rate cells, particularly of the silver/zinc type, the separator enfolding the positive electrodes has been found to resist deterioration best when silver is introduced into the polymer. In the case of cells of the nickel/cadmium type, where inter-electrode separators are used, the introduction of cadmium into the polymer has been found to lower the electrolytic resistance of the separator films and consequently the internal resistance of the cell. In a similar manner zinc or mercury, introduced into the separators used in batteries of a rechargeable nature where zinc is the negative element, are found to retard the growth of zinc crystals and to reduce the evolution of gas. In separators used for lead cells it has been useful to include titanium and antimony into the polymeric electrolyte-permeable materials. In a similar manner, when cells using cupric oxide and manganese dioxide as depolarizers have metal-containing polymers included in the separator materials, cells of improved perfromance with regard to rate, life and capacity result.

In the following examples there will be found disclosed various polymeric battery separators of either completely permeable or semi-permeable character containing various metal compounds introduced into the polymer. In addition some of the examples will detail the use of these compounds in particular types of cells. These examples, however, are not meant to restrict a particular type of metal polymerate to a particular type of cell. As a general rule it has been found that the addition of metal compounds to the polymers improve the wet strength, in the electrolyte, of the separator materials which may be in film, felted-fiber or woven-fabric form.

*Example 1*

A 1% solution of silver nitrate $AgNO_3$, containing about 1% of sodium (or potassium) acetate, is heated to a temperature of about 70° to 80° C. Cellophane (regenerated cellulose) is immersed in this solution for a period of 30 to 60 minutes. The resulting film, after washing and drying, is darkly colored and has a silver content ranging between about 1% and 2% by weight; this film exhibits marked oxidation resistance without appreciable reduction in its electrolytic permeability when used in silver/zinc cells. Specific cells embodying this material, when subjected to a special testing regime, had a life span of 90 test cycles as compared to cells merely using unmodified cellophane which under like condition have a life span of 60 test cycles.

*Example 2*

A 5% solution of silver nitrate is heated to 45°–50° C. Into this solution a strip of cellophane is immersed for approximately 60 seconds, i.e. until the cellophane has absorbed the maximum of the solution and is fully swollen. The excess solution is removed by squeezing. Then the still wet cellophane is immersed into a 2% solution of pyrogallic acid maintained at 40° C. until the silver is fully developed (40 to 60 seconds). The cellophane now has a deep brown color and, on analysis, exhibits a silver content ranging between 4% and 8% by weight. The treated cellophane is washed thoroughly in water in order to remove any metallic silver from its surface.

*Example 3*

The procedure of Example 2 is followed but a good grade of cellulosic paper (acid- and alkali-washed, as commonly used for filtering purposes) is used in lieu of cellophane. In addition, hydroquinone may be substituted for the pyrogallic acid of Example 2. The resulting paper of brownish color may then be used adjacent to the silver electrodes as a permeable wick for maintaining a supply of electrolyte at the electrode surface.

*Example 4*

A 3% solution of silver nitrate containing 1% of sodium acetate is heated to a temperature between 70° and 90° C. Into this solution is dipped a felt of wettable nylon fibers. The felt is maintained in the solution for one to two hours, removed and the excess of silver nitrate squeezed out. The nylon felt is then washed until all traces of soluble silver compounds are removed, and then dried. This nylon felt contains 1% of silver in combined form within the polyamide structure.

When used as a wicking separator in silver-containing cells, this material has been found to provide superior electrolyte retention and oxidation resistance while maintaining the high electrolytic conductivity evidenced by the material of Example 3. When a combined separator-wick assembly containing the semi-permeable separator of Example 1 and the wrapping separator of Example 4 is used, the resulting cells have twice the cycle life of control cells using cellophane and untreated nylon.

*Example 5*

Cellophane is steeped in a 1% aqueous solution of titanium sulfur oxide ($TiO_2SO_2$) in the presence of sodium carbonate ($Na_2CO_3$) of similar concentration, for thirty minutes at a temperature of 80° C. The resulting sheet material incorporates titanium cellulosate and exhibits improved resistance to penetration by metal ions when used as an inter-electrode separator.

*Example 6*

Cellophane is immersed in an aqueous titanium-chloride solution prepared by dissolving 48 g. of titanium oxide ($TiO_2$) and 26 g. of hydrochloric acid (HCl) in 1 liter of water; antimony oxide ($Sb_2O_3$) is added in an amount of 100 g. to the above solution, the same being thereupon heated to a temperature of 75° C. The cellophane, having remained for ten minutes in the heated solution, is washed with a solution of sodium carbonate ($Na_2CO_3$) to neutralize excess acidity, then washed and dried. The resulting sheet material, adapted to serve as a separator, incorporates a titanium-antimony cellulosate with a titanium content of about 8% and a somewhat lesser antimony content, the former being greatly in excess of the titanium content obtainable with the procedure of the preceding example.

*Example 7*

Cellophane is immersed in a 1% aqueous solution of potassium zincate ($Zn(OK)_2$) at temperature of 75° C. and for fifteen minutes, then washed and dried. The resulting cellophane film containing zinc cellulosate withstands penetration by zinc crystals when used as a separator in cells where zinc is the active material of the negative electrode.

*Example 8*

Polyvinyl alcohol is immersed in a 1% aqueous solution of silver nitrate ($AgNO_3$), in the presence of lithium acetate ($CH_3COOLi$) of similar concentration, at 75° C. for thirty minutes. A penetration-resistant separator material is obtained with this treatment that is particularly useful in silver/zinc batteries.

*Example 9*

The film obtained by the treatment of cellophane with a solution of potassium zincate, in the manner described in Example 7, is steeped in an aqueous solution of a chromium compound, such as a 1% chromium-trioxide ($CrO_3$) solution, at 100° C. for a period of about five minutes. This treatment substantially completely converts the zinc salt into a chromium salt of cellulose imparting to the film a distinctively greenish hue. It has been found that such separators give excellent results with regard to crystal penetration when juxtaposed with highly amalgamated zinc negatives.

*Example 10*

An aqueous solution of a rare-earth metal, such as a 2% solution of cerium nitrate ($CeNO_3$), is heated to 75° C. and has enough alkali, such as sodium hydroxide, admixed with it to reduce its pH to approximately 6.8. Sodium acetate is added in a concentration of approximately 1%. Cellophane is steeped in this solution for one hour, then washed and dried. The so heated cellophane has been found to be useful as a separator in nickel/cadmium cells.

*Example 11*

A sheet of cellophane is immersed for one week, at room temperature, in a solution of concentrated (44%) potassium hydroxide (KOH) saturated with copper oxide (CuO). The sheet is then washed and dried and, when so treated, exhibits a distinctly blue color which cannot be washed out, thus indicates that a chemical reaction (presumably involving the substitution of copper atoms for the hydrogen atoms of some of the hydroxyl groups in the cellophane) has taken place, so that the copper atoms are organically bound to the cellophane. Separators containing this material are useful adjacent to zinc electrodes in cells containing zinc negatives The sole figure of the accompanying drawing shows by way of example a separator system according to this invention forming part of a high-rate cell. This is the type of construction used in silver/zinc cells although silver/cadmium and zinc/copper-oxide cells are constructed along essentially the same lines. The positive electrode 13 is surrounded by a wrapper 15 of porous metal-containing polymeric material according to this invention. This wrapper is in turn enveloped in a sheet of semi-permeable material 10 of a polymeric nature containing a metallic polymerate. This assembly is flanked by negative electrodes 16 and 16' each wrapped in a layer of metal-containing porous polymeric separator material 17' and 17", respectively. The entire electrode assembly is inserted into a casing 21. In the case of the silver/zinc battery the positive electrode consists of silver which in the charged state is converted to the silver oxides. The permeable positive wrapper 15 consists of a silver-treated nylon felt of the nature described in Example 4. The semi-permeable material 10 is a silver-treated cellophane according to Example 1. The negative electrodes consists of metallic zinc and wrappers 17', 17" are of the type set forth in Example 3. It is understood that any other active material may be used for the electrodes in place of the silver and zinc set forth and, additionally, the order of the separator-assembly elements may be altered and the composition modified depending on the nature of the cell.

The separators according to the invention may also incorporate metals other than those specifically listed above, including lead, bismuth, vanadium, molybdenum, tungsten, other rare-earth metals besides cerium, other precious metals besides platinum and the ferromagnetic metals including iron, nickel, cobalt. In general, any metal capable of displacing alkali metals and hydroxylic hydrogen from polymeric compounds may be used.

Although proportions of metal upwards of 1% of the polymeric base material have been shown in the examples given above, amounts of and above ¼% have been found to result in an appreciable improvement of the electrochemical and/or physical properties of the separator.

I claim:

1. An electrochemical cell having a positive electrode, a negative electrode and an electrolyte in contact with said electrodes, the combination therewith of a separator intermediate said electrodes and comprising a sheet of a thermoplastic material selected from the group which consists of polyvinyl alcohol and nylon incorporating a metal chemically bound to said material, said metal being selected from the group which consists of silver, lithium, lead, bismuth, vanadium, molybdenum, tungsten, cerium, platinum, iron, nickel and cobalt.

2. The combination defined in claim 1 wherein said metal is silver and is present in an amount of 1% by weight of said material.

3. A current-producing electrochemical system comprising a positive electrode containing silver active material, a negative electrode, an electrolyte in contact with said electrodes, and a separator interposed between said electrodes, said separator intermediate said electrodes and comprising a sheet of a thermoplastic material selected from the group which consists of polyvinyl alcohol and nylon incorporating a metal chemically bound to said material.

4. A current-producing electrochemical system comprising a positive electrode, a negative electrode containing zinc active material, an electrolyte in contact with said electrodes, and a separator interposed between said electrodes, said separator intermediate said electrodes and comprising a sheet of thermoplastic material selected from the group which consists of polyvinyl alcohol and nylon incorporating a metal chemically bound to said material, said metal being selected from the group consisting of silver and lithium.

References Cited by the Examiner

UNITED STATES PATENTS

| | | | |
|---|---|---|---|
| 2,785,106 | 3/1957 | Mendelsohn | 117—121 |
| 2,956,100 | 10/1960 | Mendelsohn | 136—146 |
| 3,013,099 | 12/1961 | Mendelsohn | 136—146 |

WINSTON A. DOUGLAS, *Primary Examiner.*

JOHN H. MACK, *Examiner.*

D. L. WALTON, *Assistant Examiner.*